(12) United States Patent
Grabber

(10) Patent No.: US 9,792,831 B2
(45) Date of Patent: Oct. 17, 2017

(54) INCENTIVE SPIROMETER AND MUSICAL INSTRUMENT

(71) Applicant: Benjamin Grabber, San Antonio, TX (US)

(72) Inventor: Benjamin Grabber, San Antonio, TX (US)

(*) Notice: Subject to any disclaimer, the term of this patent is extended or adjusted under 35 U.S.C. 154(b) by 0 days.

(21) Appl. No.: 15/211,956

(22) Filed: Jul. 15, 2016

(65) Prior Publication Data

US 2017/0039872 A1   Feb. 9, 2017

Related U.S. Application Data

(60) Provisional application No. 62/200,719, filed on Aug. 4, 2015.

(51) Int. Cl.
G09B 15/06 (2006.01)
A61B 5/08 (2006.01)
G09B 15/00 (2006.01)

(52) U.S. Cl.
CPC ............ G09B 15/00 (2013.01); G09B 15/06 (2013.01)

(58) Field of Classification Search
USPC ........................................................ 84/470 R
See application file for complete search history.

(56) References Cited

U.S. PATENT DOCUMENTS

| | | | | |
|---|---|---|---|---|
| RE22,949 E * | 12/1947 | Forssberg | ............... | G10D 7/10 264/DIG. 76 |
| 2,610,538 A * | 9/1952 | Lederfine | ............... | G10D 7/123 84/377 |
| 3,742,939 A * | 7/1973 | Sayer | ................... | A61B 5/0935 411/937.2 |
| 4,034,499 A * | 7/1977 | Wild | ........................ | A63H 5/00 446/215 |
| 4,232,683 A * | 11/1980 | Bartholomew | ...... | A61B 5/0875 482/13 |
| 7,705,227 B2 * | 4/2010 | Hamanaga | ............. | G10D 9/026 84/387 R |
| 2014/0290462 A1* | 10/2014 | Chervitz | .................. | G10D 7/02 84/330 |
| 2015/0126889 A1* | 5/2015 | Frey | ........................ | A61B 5/087 600/538 |
| 2016/0158661 A1* | 6/2016 | Shaanti | ................ | A63H 33/042 84/330 |

* cited by examiner

*Primary Examiner* — Christopher Uhlir
(74) *Attorney, Agent, or Firm* — Law Offices of Mark L. Berrier

(57) ABSTRACT

Systems and methods for teaching proper wind usage for a musical instrument. One embodiment comprises an incentive spirometer apparatus having a tubular body with a bore therethrough. The apparatus has a series of ribs and grooves that are formed in the bore, on the interior surface of the tubular body. The ribs have a first, smaller inner diameter (e.g., ⅙ inch) and the grooves have a second, larger inner diameter (e.g., ⅓ inch). The ribs and grooves may be evenly spaced (e.g., ⅕ inch between successive ribs). When airflow through the tubular body is within a predetermined range, the airflow over the ribs and grooves produces an audible tone from the apparatus. When airflow through the tubular body is outside the predetermined range, no audible tone is produced by the apparatus.

10 Claims, 1 Drawing Sheet

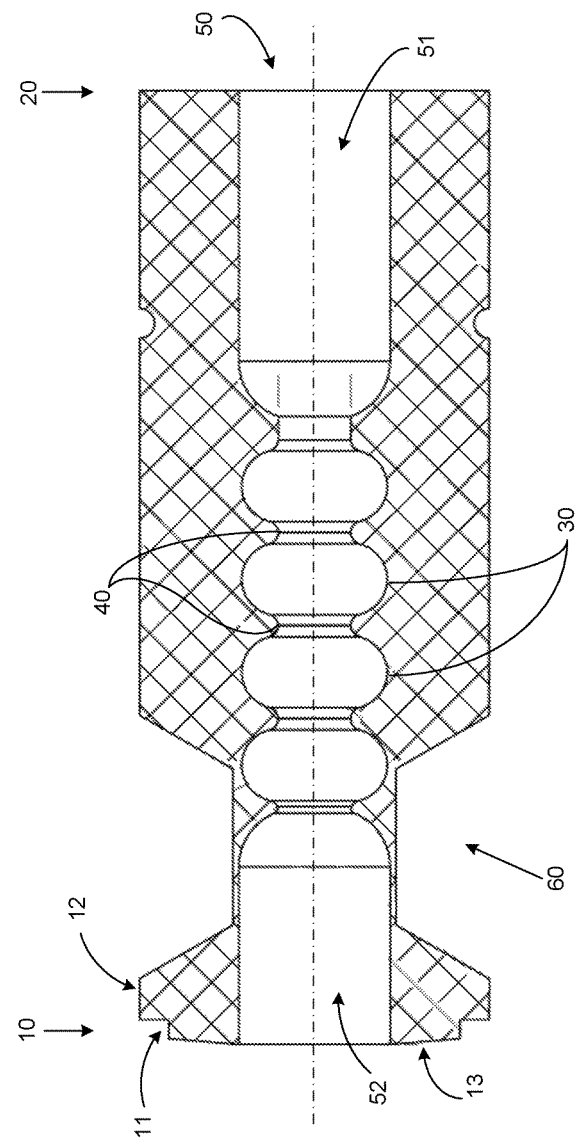

INCENTIVE SPIROMETER AND MUSICAL INSTRUMENT

CROSS-REFERENCE TO RELATED APPLICATIONS

This application claims the benefit of U.S. Provisional Patent Application 62/200,719, filed Aug. 4, 2015 by Benjamin Grabber, which is incorporated by reference as if set forth herein in its entirety.

BACKGROUND

Field of the Invention

The invention relates to systems and methods for teaching students the proper application of wind usage for the most efficient means to play a musical instrument, which may include, for example, teaching the students how to set their teeth, how to blow, and how to avoid tension in the jaw, shoulders and body.

Related Art

In the field of wind instrument pedagogy, there exists the perennial problem with each new year's recruits of teaching the proper application of wind usage for the most efficient means to play the instrument. The difficulty is in trying to teach students how to set their teeth, how to blow, and how to avoid tension in the jaw/shoulders/body. The majority of problems for even weathered musicians typically result from a fundamental problem with the application of wind.

A problem commonly experienced in teaching wind instrument students is that the majority of students, meaning in the range of 90% of them, have a poor mental concept of, and therefore poor physical control over, healthy and proper natural breathing as well as breath support (air flow) needed to play a wind instrument. The problem is exacerbated when various traditional teaching approaches result in students developing more severe problems in two areas: biting down with the jaw; and tension throughout the body, especially the throat, neck, and shoulders, which is detrimental to achieving optimal wind instrument performance.

What is needed is a solution which provides a binary result as the indicator of success or failure by the user to provide proper breath support and achieve a successful response. "Binary" is used here to mean the feedback indicator is either "on" or "off" (activated or not), and the student must provide a very exact amount of air flow to achieve the proper result and to activate the binary indicator—no incorrect input of air flow can activate a false positive indicator. Further, the solution should simultaneously force the student to suppress their own negative actions that most commonly accompany young students' efforts to achieve the result. These actions include tension in the upper torso and biting.

When students are told to take a deep breath, they instantly raise their shoulders in a "suck-in-your-gut" routine. This is a socially learned behavior that has no positive impact on proper breathing. Instead, it actually provides a negative impact to the process by increasing physical tension in the shoulders, neck and throat, which lead to restricted air flow through the body, and consequently a very poor sound from the musical instrument. When students are told to "blow harder", they instantly try to give more effort to their endeavor, but mistakenly do this by bearing down, which leads to the aforementioned tension in the upper torso, but also causes biting with the jaw. Students do this because it is a more familiar sensation of 'working harder' to achieve their goal. They do not realize it is actually working against them achieving their goal by causing more tension.

SUMMARY OF THE INVENTION

This disclosure is directed to systems and methods for teaching a user proper application of wind usage for a musical instrument. One particular embodiment comprises an incentive spirometer apparatus having a tubular body with a bore therethrough, where the tubular body has an anterior end and a posterior end. In one embodiment, the tubular body is a straight, cylindrical member, but it can have other shapes in alternative embodiments. The apparatus also has a series of ribs and grooves that are formed in the bore, on the interior surface of the tubular body. The ribs have a first, smaller inner diameter and the grooves have a second, larger inner diameter. For instance, the ribs may have an inner diameter of about one sixth of an inch, and the grooves may have an inner diameter of about one third of an inch. In one embodiment, each of the ribs and grooves is evenly spaced. For example, successive ones of the ribs may be spaced about one fifth of an inch apart from adjacent ones of the ribs. When airflow through the tubular body is within a predetermined range, the airflow over the ribs and grooves produces an audible tone from the apparatus. When airflow through the tubular body is outside the predetermined range, no audible tone is produced by the apparatus.

The bore may have an anterior throat portion between the series of ribs and grooves and the anterior end of the tubular body, and it may have a posterior portion between the series of ribs and grooves and the posterior end of the tubular body. In one embodiment, the anterior throat portion and posterior portion of the bore have the same inner diameter as the grooves. The tubular body may have an embouchure recess adjacent to the anterior end. The tubular body has a first outer diameter at the anterior end, and the embouchure recess has an outer diameter that is smaller than the first outer diameter. The embouchure recess is adapted to enable a user to position his or her lips within the embouchure recess to hold the apparatus in his or her mouth. The tubular body may also have a face at the anterior end, wherein the face has a tooth guide edge recess in its outer rim. The tooth guide edge recess enables the user to maintain his or her jaw in a desired position by positioning his or her teeth in the tooth guide edge recess. The tooth guide edge recess is adapted to cause the user's teeth to slip out of the tooth guide edge recess when he or she bites down on the apparatus. The tubular body may have an elongated portion between the ribs/grooves and the posterior end, where the elongated portion has tones holes which, when covered and uncovered, cause the apparatus to produce different tones.

An alternative embodiment comprises a method for teaching a user proper application of wind usage for a musical instrument. In this method, an incentive spirometer apparatus is provided. The apparatus has a tubular body with a bore therethrough and a series of ribs and grooves are formed on an interior surface of the tubular body within the bore, so that when airflow through the tubular body is within a predetermined range, the apparatus produces an audible tone, but when airflow through the tubular body is outside the predetermined range, the apparatus produces no audible tone. The user's mouth is placed against an anterior end of the apparatus, and the user blows air through the apparatus. The user adjusts the airflow rate at which air is blown through the apparatus until the apparatus produces the audible tone. This airflow rate is the desired wind usage for the musical instrument. The user maintains the airflow rate at which the apparatus produces the audible tone to practice the proper wind usage for the instrument. In one embodiment, when the user's mouth is against the anterior end of the apparatus, the user places the anterior end of the apparatus in his or her mouth and positions his or her lips within an embouchure recess adjacent to the anterior end to hold the apparatus in his or her mouth. The user may further position his or her teeth in a tooth guide edge recess in an outer rim of a face at the anterior end of the apparatus to maintain proper jaw positioning. The apparatus may have an elongated portion of the apparatus between the series of ribs and grooves and a posterior end of the apparatus, in which case the user may alternately cover and uncover tones holes in the elongated portion to produce different tones from the apparatus.

Numerous other embodiments are also possible.

BRIEF DESCRIPTION OF THE DRAWINGS

Other objects and advantages of the invention may become apparent upon reading the following detailed description and upon reference to the accompanying drawings.

FIG. 1 is a diagram illustrating an incentive spirometer in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

This application relates to incentive spirometers which can be used in the field of music education, as well as musical instruments. One of the objectives of various embodiments of the invention is to teach the proper wind usage for the most efficient means to play a wind instrument. The difficulty is in trying to teach students how to set their teeth, how to blow, and how to avoid tension in the jaw/shoulders/body.

Prior art solutions are found in two basic areas: using teaching techniques with rote exercises and the musical instrument itself; and using auxiliary equipment to teach exercises and develop concepts of airflow. For instance, a short piece of PVC pipe or water hose, or various apparatus such as the "breath builder" or the "wind wand" (both move a ball by utilizing the Bernoulli principle) are used.

The problem with the first area when discussing air flow is that the exercises use vague, ambiguous terminology (such as "spinning the air", "fast air", "blow harder", "hot air", "cold air", etc.), and consequently the results are ambiguous and generally are only immediately beneficial under the guidance of a professional teacher working one-on-one with the student. This is limiting in scope by being highly inefficient when working with large numbers of students at the same time. It is also limiting in educational quality in that it takes a long time for the student to truly master the concepts being taught by the teacher—often several years.

Another problem with the first area is the exercises commonly use the tool at hand, which is the musical instrument itself. The most common example is telling a student on a brass instrument to turn his or her mouthpiece backwards and bite on the shank (the portion that inserts into the instrument itself). The inherent problem is that this encourages the problem of biting by focusing on the teeth closing down. This taught behavior which leads to students biting down, necessitates remedial instruction with a teacher in a one-on-one setting. Teaching the proper techniques would instead lead the student on a successful and therefore more enjoyable endeavor.

The problem with the second area—the use of auxiliary equipment—is similar to the first area, in that the devices provide ambiguous feedback which requires evaluation and interpretation by a professional teacher. These devices encourage tension caused by biting on the device, or providing resistance to air flow, or both. Additionally, they generally provide misinformation to users by making them believe they are successfully improving their respiratory function, when in fact they may or may not be.

Embodiments of the present invention include an incentive spirometer that produces an audible tone when a user blows through it with a desired air flow. This device closely simulates the action of playing the musical instrument, while isolating the concept of air flow by eliminating the distractions of the other mechanical functions of the musical instrument, such as vibration, timbre, and fingerings. The device eliminates opportunities for false positives through unnecessary and unnatural means, and instead shifts the user's focus to produce and maintain the audible tone to indicate the user's success, while simultaneously allowing the user to subconsciously find the most natural means to breathe properly and produce the requisite air flow; this prevents the user from creating unnecessary tension and additional problems by overanalyzing the original problem for a solution. The device provides a quantifiable, binary feedback system (it either does or does not produce the audible tone) which any user can identify on his own. The guidance of a teacher will improve the user's ability to better utilize the device and perform this function, but is not necessary, even for a beginner. When the help of a teacher is solicited, this system provides a clear, unambiguous metric which facilitates unmistakable communication, rather than ambiguous terms that can be misconstrued.

The incentive spirometer provides the feedback to the user through the auditory sense, which increases the time-on-task use of this sensory pathway to evaluate quality and thereby encourages the active improvement of the musician's listening skills. The device does not change air flow resistance or pressure unnaturally, but rather provides the user feedback based on the level of the air flow input. The user is therefore forced to increase his self awareness of his own respiratory function and control, instead of aimlessly "blowing as hard as he can" with no premeditated and quantifiable measure of success or failure. The device provides binary feedback (tone or no tone) at multiple levels. For instance, the device may produce a tone at air flows that are multiples of 100 CIM, but not at other air flows. This allows the user to exercise respiratory control at multiple levels, with no change in the device, the same technique of usage, and the same binary response system to indicate the user's success or failure of the intended goal. The device accomplishes this function, not through mechanical changes in the device itself, but by the variance of input by the user, which still does not require the guidance of a teacher, but can be instantaneously and correctly interpreted by the user on his own. The device also provides a suppressive function which is activated only when the user attempts to bite down on the device. The user is forced to not bite down, but to instead provide only a healthy balance of tension in the jaw muscles to support healthy instrument playing. The device provides a function that allows the user to use the embouchure (lips) to hold the device, which therefore simultaneously encourages strengthening of the embouchure (lip) muscles.

While various prior art devices have some features that are similar to those of the incentive spirometer, the present device has a distinctive combination of features that sets it apart from these prior art devices. Below are several examples of prior art devices and some of the disadvantages associated with them.

U.S. Pat. No. 5,746,640, entitled "Motion-activated musical device", discloses a corrugated tube that makes a noise when it is swung in the air. This device is large and was never intended to be used under power of a performance musician's ability to blow through it. While the tube makes a tone as it is swung in the air, it produces this tone as a result of moving the instrument through the air, rather than the user blowing through it. Additionally, there is no gap in the audible response outside the desired air flow. Consequently, the tube does not teach a user to achieve a goal with narrow parameters (desired air flow), but instead produces an open-ended response spectrum.

By contrast, the incentive spirometer does not require the physical space and excessive mechanical motion (swinging the equipment overhead) necessary to operate the whirly tube. The present device requires very little space—no more than a traditional/conventional wind instrument such as a recorder or fipple flute.

U.S. Pat. No. 6,726,598, entitled "Pulmonary exercise device" and U.S. Pat. No. 4,770,413, entitled "Breathing exercise device" discloses devices that rely on mechanical means to change resistance to air flow. Resistance-based incentive spirometers and breathing aids do not aid the user in monitoring his most effective respiration. Rather, these devices encourage the user simply to "blow harder" against a resistance and to thereby try to achieve the greatest possible air flow through the device. One of the problems with this approach is that the user can provide a highly varied amount of air input to achieve a very broad, generic, unspecific result. The user does not receive feedback that indicates a desired level of air flow and consequently never achieves the goal of improving self awareness and control of effective respiration. The resistive devices disclosed in these patents also provide the opportunity for the user to select resistances which could be detrimental. In other words, the devices could provide too much resistance, and could therefore strain the possibly poor health of the user.

The incentive spirometer, on the other hand, forces the user to self-monitor and make physiological adjustments to their air input (or "breath support") to produce the desired outcome/effect (the audible tone). It therefore improves the effectiveness and self-awareness of the quality of the user's own respiration.

The incentive spirometer also informs the user of the level at which the user is functioning as a result of the design of the device. The user cannot change the parameters to dangerous proportions, so the user may safely utilize the device. The incentive spirometer cannot produce such a high level of backpressure that the user might strain physically in an effort to produce the desired effect. Instead, it provides feedback for the user to detect, but does not provide an ambiguous goal which could give the user the opportunity to risk unhealthy attempts at use.

U.S. Pat. No. 4,506,883, entitled "Harness apparatus and method for breathing exercises" discloses a device that puts the user's focus on musculature instead of airflow. When using this device, the user can flex many of the wrong muscles in many wrong uses, yet still believe he is exercising correctly. With this device, the user could in fact not blow any air at all and still achieve the results indicated by the device. The incentive spirometer only provides a desired result (the audible tone) when the proper airflow is achieved through the device. This allows the user to focus on the proper goal, and relaxes the user so that the user's body will naturally only activate the muscles absolutely necessary to achieve the result, while leaving relaxed all muscles which are unnecessary. This encourages activation of the autonomic respiratory system, as opposed to a cognitive approach, such as the prior art harness apparatus does (which usually is the source of the breathing problems the user is experiencing). The harness device is also unnecessarily awkward in implementation.

There is also an unpatented embouchure strengthening device which is called the "PETE" Personal Embouchure Training Exerciser. This device provides no accommodation for teaching breathing techniques, and doesn't teach anti-biting techniques as taught by the incentive spirometer. Other teaching methods may include using a piece of ordinary garden hose or PVC pipe. These methods teach wind students how to blow a large quantity of air by simply blowing through a tubular body with a large inner diameter (around 0.75 inch diameter). These methods, however, give only abstract concepts with no quantifiable effect to verify proper usage by the user. These non-quantifiable results must be interpreted by a teacher into usable concepts for both the teacher and student. The accuracy of understanding such concepts, when interpreted by various individuals, may easily get misconstrued by users, leading to improper use of the equipment and method. Various other breathing aids are available, but they provide no quantifiable feedback, and typically operate based on pressure, instead of air velocity (a subject covered by the teachings of revered wind instrument pedagogue, Arnold Jacobs). These breathing aids are commonly expensive, bulky/awkward, and prone to damage/failed mechanics.

The present incentive spirometer has a number of advantages over the prior art. For example, it produces quantifiable feedback which results from the design of the device. The device has no moving mechanical parts which could fail. The device is small, one embodiment being in the range of approximately three-quarters of an inch in diameter and two inches long. The device is therefore less clumsy for the user than most prior art devices. The present device is simple to implement. By providing embodiments that have different sizes, shapes, and spacing of the grooves and ribs (as will be described below), the present device can provide desired audible harmonics with an absence of any other sound except the white noise of the air flow. This allows the user to better identify the accuracy and quality of his efforts. The incentive spirometer places the user's focus on achievement of the desired effect (the audible tone) instead of unnecessarily focusing on other physiological aspects. This has been a proven method in musical pedagogy to produce better performance of air flow by the performer.

Referring to FIG. 1, an exemplary embodiment of the incentive spirometer is illustrated. In this embodiment, the incentive spirometer has a cylindrical body having anterior 10 and posterior 20 ends. The anterior end is closest to the user (toward the left in the FIGURE), while the posterior end faces away from the user (toward the right in the FIGURE). The device has a bore 50 through its length, from the anterior end to the posterior end. The size of the bore is independent of the other bore measurements (e.g., the inner diameter at the ribs). Grooves 30 and ribs 40 are formed in the inner diameter of the bore. There may be multiple grooves and ribs, or just one. While the embodiment of FIG. 1 has a straight/cylindrical shape, with the advent of 3D printing, the throat/bore would not necessarily have to be straight-line, but could have any three-dimensional variation or combination of variations, including but not limited to helical, loop-the-loop or random configurations.

The incentive spirometer produces a tone as a result of a specific amount of airflow which is determined by the dimensions of the device. The dimensions are decided upon by the designer as to teach the intended goal of the user providing a desired amount of airflow. The production of tone is achieved by creating a succession of grooves and ribs along the air flow path through the bore of the device. The dimensions of the grooves and ribs, and distances between said grooves and ribs may vary in measurement according to the desired effect to be achieved. In one embodiment, the effect is a separation of the notes of the natural harmonic series.

The grooves and ribs cause the air to "tumble" and create a toroidal vortex. When the air flow is within a desired range, the device produces an audible tone or whistle. The air flow at which the tone is produced is determined by the configuration of the grooves and ribs in the bore of the device. Although the grooves and ribs are rounded in the embodiment of FIG. 1, this is not necessary in all embodiments, and other embodiments may have grooves and ribs that are square or have other shapes. The grooves and ribs may have various combinations of concave or convex, and angular shapes. The grooves and ribs may also have a combination of diameters/depths of cut and/or distances between them.

The tooth guide edge is a small recess 11 in the face 13 at the outer edge of the rim 12. The tooth guide edge provides a place for the user to place his teeth, giving him a means to feel how far apart the teeth should be open. The tooth guide edge does not, however, allow enough surface to bite down and hold the device with the teeth. Consequently, if the user bites down, this will cause the teeth to slip off the tooth guide edge, and the user will have to re-set the device for proper usage.

The incentive spirometer has an embouchure recess which allows the user to utilize the device in a hands-free manner. The embouchure recess 60 is a recess in the outside of the body a short distance from the anterior end of the device, such that a users lips may fit into the recess and allow the user to hold it with the lips. The user places his lips over the rim and in the embouchure recess, while simultaneously keeping the teeth in the recess of the tooth guide edge. This allows the user to hold the device without using his hands. It also teaches the user how to relax the jaw muscles during the respiration exercise, so as to de-incentivize the use of tension in an undesired manner.

In one embodiment, the incentive spirometer device may have a lengthened body with tone holes to create a musical instrument which may be played in a similar fashion to a traditional recorder or fipple flute. In another embodiment, the device may have a body that has a variable length (e.g., a sliding body such as in a slide whistle or trombone) so that it can be played as a musical instrument.

The invention includes numerous embodiments that may include one or more of the features described above. For example, one embodiment is a simple tubular device having one or more grooves and/or ribs on its inner diameter. The dimensions of the tube and the grooves and/or ribs are designed to produce an audible tone only when the air flow through the device is within a desired range. In one embodiment, the inner diameter of the bore through the device is about one-third of an inch at the openings, and about one-sixth of an inch at the ribs. The inner diameter at the grooves between the ribs is about one-third of an inch. The ribs are spaced about one-fifth of an inch apart along the length of the device.

In an alternative embodiment, the device may include an embouchure recess so that the user can hold the device with his lips. Another alternative embodiment may provide a tooth guide edge at the outer rim of the anterior end so that the user can properly position his teeth at the anterior end of the device. In another alternative embodiment, the body of the tubular device can be lengthened, and tone holes can be provided so that the device can be used as a musical instrument.

As noted above, embodiments of the present invention may overcome a number of problems that exist in the prior art. These problems include, for example, the expense and the difficulty of using the prior art systems and methods. Prior art devices are typically awkward to hold and use at the same time—they must be held at an optimum angle, otherwise the device won't work properly. This allows the user to "cheat" or otherwise fool himself into believing he is using it properly and succeeding. Additionally, the pedagogic methods of the prior art all use ambiguous, unquantifiable information, and may require training for self monitoring, or memorizing various information. There is commonly a learning curve to use the prior art devices in different ways, including adjusting back pressure valves and how to cover their holes with your fingers at the same time as blowing through it, which becomes awkward. It is typically slow to move between the prior art training devices and actual instruments. With prior art training devices, the user is instructed to "blow as much as you possibly can," rather than a quantified amount. The results are ambiguous and require discernment from the teacher before they can be implemented. Further, the instructions can vary from one teacher to another.

The present incentive spirometer provides a simple metric that will instantly make sense to the user, will require minimal training for self monitoring, and will not require memorizing various information, other than the physiological "muscle memory" of producing the audible tone. This device provides the most accurate mimicry of the actual embouchure, and is therefore the best tool for musicians. The device can also provide therapeutic troubleshooting for advanced musician problems, and can narrow the goal of training by eliminating the continuous feedback response that may be present in other devices.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the particular embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed herein.

What is claimed is:

1. An incentive spirometer apparatus comprising:
   a tubular body having a bore therethrough, wherein the tubular body has an anterior end and a posterior end; and
   a series of ribs and grooves that are formed on an interior surface of the tubular body within the bore, wherein the ribs have a first inner diameter and the grooves have a second inner diameter, wherein the first inner diameter is less than the second inner diameter;
   wherein when airflow through the tubular body is within a predetermined range, the airflow over the series of ribs and grooves produces an audible tone;
   wherein when airflow through the tubular body is outside the predetermined range, the airflow over the series of ribs and grooves produces no audible tone;
   wherein the tubular body has a face at the anterior end, wherein the face has an outer rim, wherein the outer rim has a tooth guide edge recess therein, wherein the tooth guide edge recess is adapted to enable a user to position the user's teeth in the tooth guide edge recess and thereby maintain the user's jaws in a desired position, and wherein the tooth guide edge recess is adapted to cause the user's teeth to slip out of the tooth guide edge recess when the user bites down on the apparatus.

2. The apparatus of claim 1, wherein each of the ribs and grooves is evenly spaced from adjacent ones of the series of ribs and grooves.

3. The apparatus of claim 2, wherein the ribs have an inner diameter of about one sixth of an inch, wherein the grooves have an inner diameter of about one third of an inch, and wherein successive ones of the ribs are spaced about one fifth of an inch apart.

4. The apparatus of claim 3, wherein the bore has an anterior throat portion between the anterior end of the tubular body and the series of ribs and grooves, and wherein the anterior throat portion has the second inner diameter.

5. The apparatus of claim 3, wherein the bore has a posterior portion between the posterior end of the tubular body and the series of ribs and grooves, and wherein the posterior portion of the bore has the second inner diameter.

6. The apparatus of claim 1, wherein the tubular body has a first outer diameter at the anterior end, wherein the tubular body has an embouchure recess adjacent to the anterior end, wherein the embouchure recess has a second outer diameter that is less than the first outer diameter, wherein the embouchure recess is adapted to enable a user to position the user's lips within the embouchure recess and thereby hold the tubular body against the user's teeth.

7. The apparatus of claim 1, wherein the tubular body is cylindrical.

8. The apparatus of claim 1, wherein the tubular body has a shape that is not straight.

9. The apparatus of claim 1, wherein the tubular body has an elongated portion between the series of ribs and grooves and the posterior end, wherein the elongated portion has one or more tones holes therein, wherein the apparatus produces different tones when the tones holes are covered and uncovered.

10. The apparatus of claim 1, wherein the tubular body has an elongated portion between the series of ribs and grooves and the posterior end, wherein the elongated portion has a length that is variable by the user, wherein the apparatus produces different tones when the elongated portion is lengthened and shortened.

* * * * *